Jan. 11, 1949.   R. W. ROGERS ET AL   2,459,134
PAWL RELEASE FOR PENDULUM ARMS OF TESTING MACHINES
Filed June 13, 1947   2 Sheets-Sheet 2
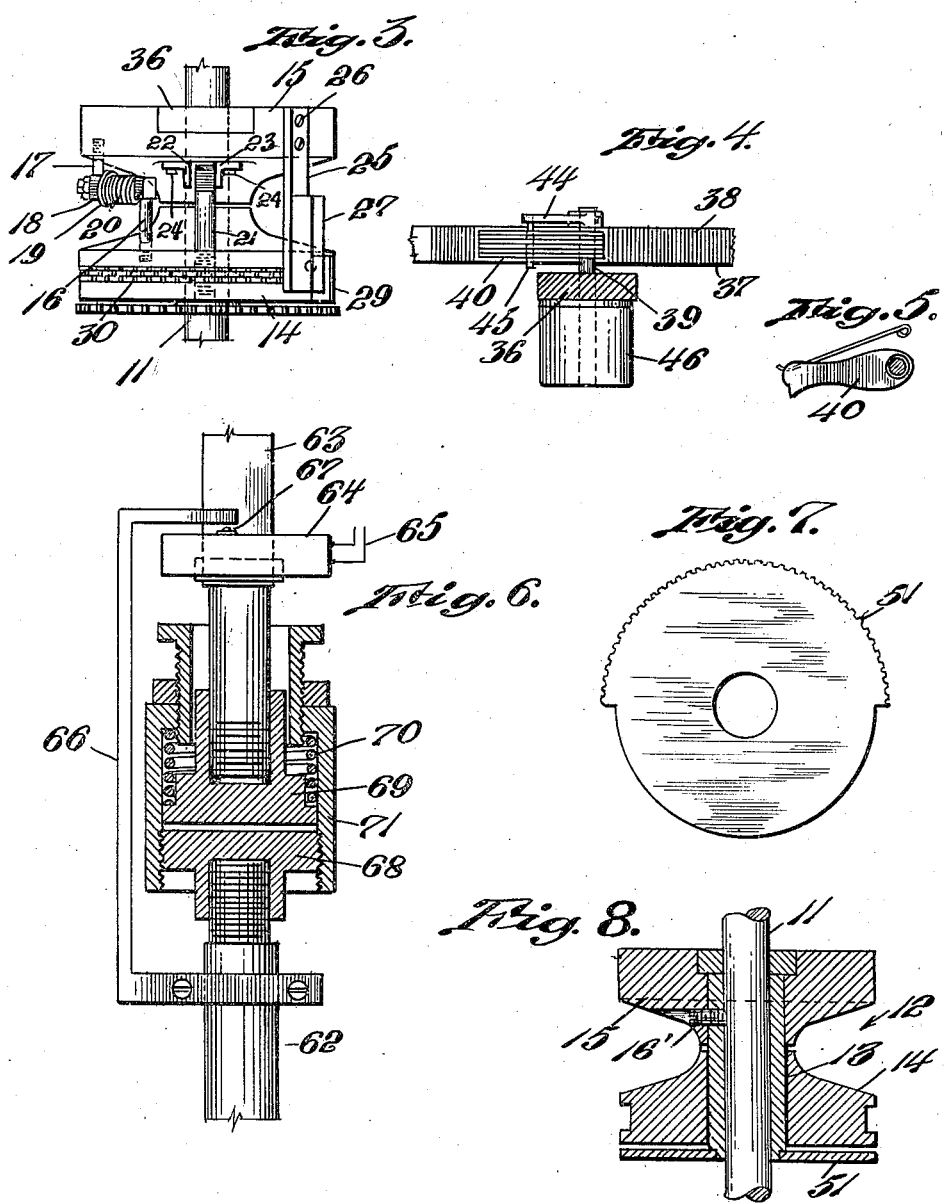
INVENTORS
Robert W. Rogers
Charles C. Blanch
BY Barlow & Barlow
ATTORNEYS.

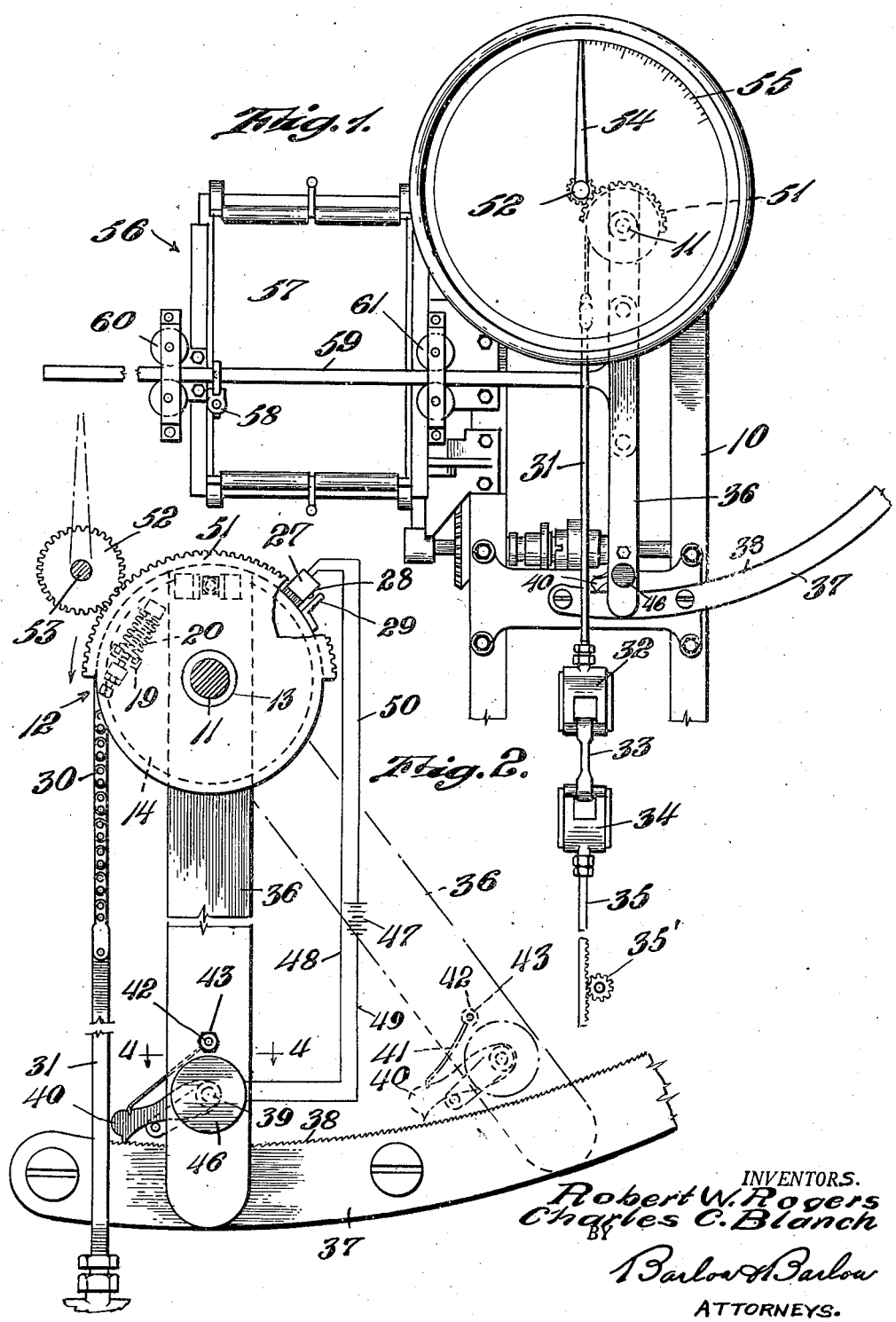

Patented Jan. 11, 1949

2,459,134

UNITED STATES PATENT OFFICE 2,459,134

PAWL RELEASE FOR PENDULUM ARMS OF TESTING MACHINES

Robert W. Rogers, Barrington, and Charles C. Blanch, Providence, R. I., assignors to Scott Testers, Inc., a corporation of Rhode Island Application June 13, 1947, Serial No. 754,334

6 Claims. (Cl. 73—98)

This invention relates to a testing machine of that type which utilizes a pivotally mounted arm which is weighted to resist the load which is applied to the specimen and which arm swings as the load is applied to the specimen.

Usually in testing machines of this character, the arm which is swung as load is applied is provided with a plurality of ratchet teeth, and one or more pawls which are carried by the arm engage these teeth dragging over the teeth as the arm moves along an arcuate segment so that when the specimen breaks or load ceases to be applied to the arm rather than return to starting position the arm will be maintained in the position to which it is swung in order that a reading of the apparatus may be had. The dragging of these one or more pawls over the ratchet teeth creates a certain amount of friction which may detract from the accuracy of the test; and, due to varying conditions, errors in the order of one to two per cent in the low ranges may occur by means of this arrangement.

One of the objects of this invention is to provide a free swinging pendulum for the resistance to loads applied in the testing machine.

Another object of this invention is to eliminate the friction caused by dragging the pawls over the ratchet teeth.

Another object of this invention is to provide a means which will cause the pawls to be lifted from the ratchet teeth as load is applied but will cause the pawls to instantly return to engage the ratchet teeth when the specimen breaks and load is no longer applied on the arm which moves along the ratchet teeth.

Another object of this invention is to provide for an automatic control of the pawls as the test proceeds.

With these and other objects in view, the invention consists of certain novel features of construction as will be more fully described and particularly pointed out in the appended claims.

In the accompanying drawings:

Fig. 1 is a fragmental view of a portion of a testing machine illustrating the pendulum arm, the scale and the segment having ratchet teeth along which the arm moves with pawls carried by this arm for engaging the teeth;

Fig. 2 is a view showing a part of the structure shown in Fig. 1 and on a larger scale and illustrating diagramatically the electrical circuit which is used for operation of the pawl-lifting means;

Fig. 3 is a top plan view of the two-part drum through which the load is applied to the pendulum arm;

Fig. 4 is a sectional view on substantially line 4—4 of Fig. 2;

Fig. 5 is a sectional view through the shaft upon which the pawls are mounted and illustrating in greater detail one of the pawls;

Fig. 6 is a sectional view of a modified form of control for the pawls.

Fig. 7 is a face view of the segmental gear used.

Fig. 8 is a sectional view through the two-part drum of Fig. 3.

In proceeding with this invention, we mount a solenoid on the pendulum arm with an arrangement so that when this solenoid is energized the pawls will be lifted while we change the drum through which load is applied to the arm so that by relative movement of the parts of the drum responsive to the application of load to the drum a switch may be actuated. A spring is interposed between the relatively moving parts of the drum so that upon rupture of the specimen to release load on the drum the parts thereof will relatively move to open the switch and de-energize the solenoid to permit the pawls to move into engagement with the ratchet teeth, and we assist their movement into engagement with the ratchet teeth by the applicaion of an individual spring on each of the pawls.

With reference to the drawings, 10 designates a part of the framework of a testing machine which has a shaft 11 (see Fig. 2) supported by the framework upon which a drum 12 is mounted. A sleeve 13 extends along the shaft. This drum consists of two parts 14 and 15 (see Figs. 3 and 8). A threaded pin 16' extends through the part 15 and through the sleeve and into a recess on the shaft 11 to lock these parts together. The part 14 is free to rotate on the sleeve. A pin 16 is secured to the section 14 of the drum, and the pin 17 is secured to the section 15 of the drum. Each of these pins is equipped with heads 18 which support cups 19 between which a spring 20 is positioned so as to relatively move the sections 14 and 15 of the drum in opposite directions. This movement is limited by a strut 21 secured to the member 14 which extends toward the member 15 into a position between two L-shaped abutments 22 and 23 secured on the member 15. Thus, the relative movement between the sections 14 and 15 is controlled by the distance apart of these L-shaped abutments, and this distance may be varied as each of these is secured to the drum by a screw 24.

A bar 25 is fastened to the section 15 of the drum by screws 26 and carries a micro-switch 27 which has a button 28 (see Fig. 2) which may press against the abutment 29 carried by the section 14. When the sections are in one relative position, the button will be pressed inwardly to close the contacts of the switch; while, when the parts are in the position to which they are urged by the spring 20, the button will be in a position to open the contacts of the switch.

The section 14 of the drum has the usual multitude link chain 30 partially wrapped about it and secured to it in a recess provided therefor which chain engages the rod 31 which in turn is attached to the specimen clamp 32 to resist pull on the specimen 33 which has load applied thereto through the opposing clamp 34 by a rod 35 and an actuating source of power 35'.

The other section 15 of the drum has a pendulum arm 36 secured thereto in a recess provided for it and swings as the drum rotates about its axis counter-clockwise as viewed in Figs. 1 and 2. An arcuate segment 37 is secured to the framework 10 of the apparatus and provides a plurality of teeth 38 along its concave edge which is concentric with the center of the shaft 11. A shaft 39 is carried by the arm 36 and pivotally mounts a plurality of pawls 40 each of a somewhat slightly different length so that together the pawls will span approximately the distance of one tooth 38, so that regardless of the position of the arm along the segment one of the pawls will be in a position to engage a tooth thereof.

Each of these teeth is pressed downwardly by a spring 41 which is secured to a shaft 42 also carried by the arm 36. This shaft may be rotated to different positions about its axis and there clamped by a nut 43 so as to apply more or less pressure to the pawl which it engages. A crank 44 has its arm 45 located beneath all of the pawls, and it is fixed to the shaft 39 which is rotatably mounted in the pendulum arm 36. The solenoid 46 is secured to the arm and is so arranged that when energized it will rotate the crank 44 so as to lift all of the pawls from engagement with the teeth 38.

An electric circuit (see Fig. 2) having a source of energy 47 is completed between the solenoid 46 and the switch 27 by leads 48, 49 and 50.

The arrangement is such that as load is applied by means of the rod 35 on the specimen 33, the specimen will move downwardly, as illustrated in Fig. 1, and will rotate the drum by reason of the section 14 moving relative to the section 15 against the action spring 20 so that the abutment 29 will force inwardly the button 28 and close the switch, while pin 21 will engage the abutment 22 so that further movement will begin to move the pendulum arm counter-clockwise, as viewed in Figs. 1 and 2. The circuit being closed and energy being applied to the solenoid 46, the crank arm 44 will swing and lift the pawls from position.

Should the specimen 33 break, then load will be released on the section 14 of the drum. The spring 20 will serve to move the section 14 relative to the section 15 to release pressure on the button 28 which will cause the circuit to open, thus de-energizing the solenoid 46 and permitting the action of the springs 41 on each of the pawls to immediately move the pawls into engagement with the ratchet teeth so that one of the pawls will pick up a ratchet tooth and hold the pendulum arm in the position to which it has been swung.

The sleeve 13 to which the section 15 of the drum is secured carries a mutilated gear with teeth 51 which mesh with the teeth of pinion 52 on shaft 53 to move the pointer 54 over a dial 55 that the point at which the specimen became broken may be observed. As the section 14 moves relative to the gear 51 and section 15, the lost motion does not move the pointer 54, and the sleeve is held in place. Recording mchanism designated 56 comprises a chart platten 57 and a stylus 58. This stylus is moved by means of the link 59 which is anti-frictionally mounted by means of rollers 60 and 61, the link being attached to the pendulum arm in a manner to permit its movement therewith.

In some cases, instead of providing the electric circuit actuating switch in the pendulum drum, we may provide the actuating switch in the rod 31 (shown in Fig. 1), and in Fig. 6 we have illustrated this rod as formed in two parts 62 and 63. The part 63 is provided with a Micro-Switch 64 with its leads 65 to the solenoid. The arm 62 is provided with a U-shaped member 66 to reach to a position to actuate the button 67 of the Micro-Switch. The portion 62 is also provided with a head 68, while the portion 63 of the rod is provided with a head 69. A spring tending to move these two parts 62 and 63 toward each other is designated 70 and acts upon the head 69 to move the part 63 downwardly, while it acts upon the coupling 71 which is screw threaded to the head 68 to move the head 68 and rod 62 upwardly. Thus, when load is applied and the part 62 moves downwardly to compress the spring it closes the switch and completes the circuit, and when the specimen breaks the spring will move the member 66 upwardly away from the button 67 de-energizing the solenoid and permitting the springs 41 to quickly press the pawls into engagement with the ratchet teeth.

We claim:

1. In a testing machine of the character described, a pivotally mounted arm, a pair of specimen clamps, means for applying load to the specimen through one of the clamps, means for interconnecting the other clamp with said arm for swinging said arm about its pivot as load is applied to a specimen, a segment having ratchet teeth, a pawl carried by said arm to engage said teeth and hold the arm in the position to which it is swung about its pivot, means responsive to the application of load for lifting said pawl from engagement with said teeth and responsive to release of the load for movement of the pawl into engagement with said teeth whereby the friction of dragging the pawl over the teeth as load is applied is eliminated.

2. In a testing machine as in claim 1 wherein said load responsive means comprises a solenoid, a member actuated thereby and connected to said pawl for actuating said pawl.

3. In a testing machine as in claim 1 wherein said load responsive means comprises a solenoid, a member actuated thereby and a crank arm extending beneath said pawl and actuated by said member.

4. In a testing machine as in claim 1 wherein there are a plurality of pawls of different lengths to engage said ratchet teeth and an individual spring actuates each of said pawls.

5. In a testing machine as in claim 1 wherein a load responsive means providing for a relative motion connects the swinging arm and the specimen clamp for swinging the arm, and a switch is actuated by the relative motion of said means.

6. In a testing machine as in claim 1 wherein a load responsive means providing for a relative motion connects the swinging arm and the specimen clamp for swinging the arm, a switch is actuated by the relative motion of said means, and a spring serves to move said load responsive means in a direction opposite to that caused by the load.

ROBERT W. ROGERS.
CHARLES C. BLANCH.

REFERENCES CITED

The following references are of record in the file of this patent:

UNITED STATES PATENTS

| Number | Name | Date |
|---|---|---|
| 598,205 | McKnight | Feb. 1, 1898 |
| 1,184,034 | Scott | May 23, 1916 |
| 1,911,006 | Valentine | May 23, 1933 |

FOREIGN PATENTS

| Number | Country | Date |
|---|---|---|
| 25,753 | Great Britain | 1913 |